United States Patent
Bar Noy et al.

(10) Patent No.: US 11,212,305 B2
(45) Date of Patent: Dec. 28, 2021

(54) WEB APPLICATION SECURITY METHODS AND SYSTEMS

(71) Applicant: ForceNock Security Ltd., Givatayim (IL)

(72) Inventors: Dotan Bar Noy, Givataim (IL); Vitaly Neyman, Netanya (IL); Pavel Borovsky, Tel Aviv (IL)

(73) Assignee: CHECK POINT WEB APPLICATIONS AND API PROTECTION LTD., Tel Aviv (IL)

( * ) Notice: Subject to any disclaimer, the term of this patent is extended or adjusted under 35 U.S.C. 154(b) by 309 days.

(21) Appl. No.: 16/396,778

(22) Filed: Apr. 29, 2019

(65) Prior Publication Data

US 2019/0334940 A1    Oct. 31, 2019

Related U.S. Application Data

(60) Provisional application No. 62/663,277, filed on Apr. 27, 2018.

(51) Int. Cl.
| | |
|---|---|
| *H04L 29/06* | (2006.01) |
| *G06F 15/16* | (2006.01) |
| *H04L 29/08* | (2006.01) |
| *H04L 12/26* | (2006.01) |
| *G06F 16/23* | (2019.01) |

(52) U.S. Cl.
CPC ...... *H04L 63/1425* (2013.01); *G06F 16/2379* (2019.01); *H04L 43/04* (2013.01); *H04L 63/1416* (2013.01); *H04L 63/20* (2013.01); *H04L 67/025* (2013.01); *H04L 67/42* (2013.01)

(58) Field of Classification Search
USPC ................... 726/23, 22, 28, 27, 3
See application file for complete search history.

(56) References Cited

U.S. PATENT DOCUMENTS

| 7,634,810 B2 * | 12/2009 | Goodman | H04L 63/1416 726/22 |
|---|---|---|---|
| 7,725,587 B1 * | 5/2010 | Jacoby | H04L 63/1416 709/229 |
| 8,397,284 B2 * | 3/2013 | Kommareddy | H04L 63/1458 726/13 |
| 2005/0055399 A1 * | 3/2005 | Savchuk | H04L 63/1416 709/203 |
| 2006/0161984 A1 * | 7/2006 | Phillips | G06F 21/564 726/24 |
| 2007/0067853 A1 * | 3/2007 | Ramsey | G06F 21/316 726/28 |

(Continued)

*Primary Examiner* — Jude Jean Gilles
(74) *Attorney, Agent, or Firm* — Mark M. Friedman

(57) ABSTRACT

Computerized methods and systems receive a request message from a client device that is addressed to a web server hosting at least one web application. the request message is analyzed to identify potential attack indicators that are present in the request message. Each potential attack indicator has a score. A reputation score is assigned to the request message that is associated with behavior of the client device relative other client devices sending request message to the web server. A composite score for the request message is calculated based in part on the scores of the potential attack indicators and the reputation score. The request message is handled in accordance with the calculated composite score.

20 Claims, 9 Drawing Sheets

(56) References Cited

U.S. PATENT DOCUMENTS

| | | | |
|---|---|---|---|
| 2009/0138592 A1* | 5/2009 | Overcash | H04L 63/1425 709/224 |
| 2013/0111595 A1* | 5/2013 | Amit | G06F 21/577 726/25 |
| 2015/0058976 A1* | 2/2015 | Carney | H04L 63/1408 726/22 |
| 2015/0358343 A1* | 12/2015 | Segal | H04L 63/1425 726/23 |
| 2016/0009392 A1* | 1/2016 | Korhonen | G05D 1/0011 244/137.3 |
| 2016/0072837 A1* | 3/2016 | Arrowood | H04L 63/1416 726/23 |
| 2017/0070487 A1* | 3/2017 | Greenberg | H04W 12/02 |

* cited by examiner

WEB APPLICATION SECURITY METHODS AND SYSTEMS

CROSS-REFERENCE TO RELATED APPLICATIONS

This application claims priority from U.S. Provisional Patent Application No. 62/663,277, filed Apr. 27, 2018, whose disclosure is incorporated by reference in its entirety herein.

TECHNICAL FIELD

The present invention relates to web application security system and methods.

BACKGROUND OF THE INVENTION

Malicious requests in communication protocol messages, for example, hypertext transfer protocol (HTTP) request messages, are designed to identify vulnerabilities in web applications and exploit those vulnerabilities to gain unauthorized access to web application data, including personal user data (e.g., financial data), propagate malicious content to computer devices accessing the web applications, and perform malicious activity on the web server hosting the web applications, such as denial of service activity.

Such malicious requests hide within legitimate web traffic (e.g., legitimate HTTP requests) but are difficult to detect due to the large amount of web traffic flowing to and from web servers. Conventional solutions attempt to detect malicious requests by performing computationally exhaustive signature matching techniques, which require a high level of system administrator web security knowledge/experience and interaction with web security systems.

SUMMARY OF THE INVENTION

The present invention is directed to computerized methods and systems which provide security for web applications. The computerized methods and systems calculate weighted scores based on context-driven inspection of communication protocol request messages (e.g., HTTP requests) and behavioral models of the sources that send the request messages. In addition, the computerized methods and systems of the present embodiments employ correlation techniques to detect attack patterns, making it difficult for attackers to find system weaknesses without being detected. As will become evident from the detailed disclosure below, the computerized methods and systems continuously adapt as request messages are received, thereby reducing false-positive identifications of request messages as suspicious/malicious requests, without adversely effecting the true-positive detection rate. In addition, the continual adaptation of the system lends itself to deployment with little to no configuration, thereby reducing the amount of interaction required by system administrators.

Embodiments of the present invention are directed to a method for providing security to a web server hosting at least one web application. The method comprises: receiving a request message from a client device that is addressed to the web server; analyzing the request message to identify potential attack indicators that are present in the request message, each potential attack indicator having a score; calculating a composite score for the request message based in part on: the scores of the potential attack indicators, and a reputation score assigned to the request message that is associated with behavior of the client device relative other client devices sending request message to the web server; and handling the request message in accordance with the composite score.

Optionally, the reputation scores are calculated based on comparisons between attributes of one or more identifiers of the client device and attributes of one or more identifiers of the other client devices.

Optionally, the attributes of the one or more identifiers of the other client devices are stored as entries in a source database and are updated based on the comparisons.

Optionally, the assigned scores are stored as entries in an indicator score database, and the assigned scores in the indicator score database are updated based on the comparisons.

Optionally, the method further comprises: calculating a correlation score for the request message based on attributes of the request message that are related to attributes of other request messages associated with malicious attacks on the web server.

Optionally, the method further comprises: updating the reputation score assigned to the request message based on the correlation score.

Optionally, the method further comprises: calculating combinations of the potential attack indicators and combination scores for the combinations of the potential attack indicators, and the composite score is further based in part on the combination scores.

Optionally, the method further comprises: comparing a Uniform Resource Locator (URL) and one or more parameters of the request message with a listing of URLs and parameters known to be subject to malicious attacks; comparing the URL and the one or more parameters of the request message with a listing of URLs and parameters known to be to generate false indications of being malicious request messages, and the composite score is further based in part on the comparisons with the listing of URLs and parameters known to be subject to malicious attacks and the listing of URLs and parameters known to be to generate false indications of being malicious request messages.

Optionally, the handling includes at least one of blocking the request message or passing the request message to the web server.

Optionally, the method further comprises: evaluating the composite score against at least one threshold criterion, and the handling includes blocking the request message if the composite score satisfies the at least one threshold criterion, and the handling includes passing the request message to the web server if the composite score dissatisfies the at least one threshold criterion.

Optionally, the request message is a hypertext transfer protocol (HTTP) request message.

Embodiments of the present invention are directed to a computer system for providing security to a web server hosting at least one web application. The computer system comprises: a storage medium for storing computer components; and a computerized processor for executing the computer components. The computer components comprise: a detection module configured for: receiving a request message from a client device that is addressed to the web server, and analyzing the request message to identify potential attack indicators that are present in the request message, each potential attack indicator having a score; and a composite scoring module configured for: calculating a composite score for the request message based in part on: the scores of the potential attack indicators, and a reputation score assigned to the request message that is associated with behavior of the client device relative other client devices sending request message to the web server; and handling the request message in accordance with the composite score.

Optionally, the computer system further comprises: a source database, and the computer components further comprise: a source collection module configured for: analyzing request messages to extract source identifiers of other client devices that previously sent request messages to the web server, assigning one or more attributes to each of the source identifiers, and storing the assigned attributes and source identifiers in the source database.

Optionally, the computer components further comprise: a behavioral analysis module configured for: calculating the reputation scores based on comparisons between attributes of one or more identifiers of the client device and assigned attributes and the source identifiers stored in the source database.

Optionally, the behavioral analysis module is further configured for: updating the assigned attributes and the source identifiers stored in the source database are based on the comparisons.

Optionally, the computer system further comprises: an indicator score database that stores the assigned scores, and the computer components further comprise: an indicator analysis module configured for retrieving the assigned scores from the indicator score database, and updating the assigned scores based on the comparisons.

Optionally, the indicator analysis module is further configured for: calculating combinations of the potential attack indicators and combination scores for the combinations of the potential attack indicators, and the composite score is further based in part on the combination scores.

Optionally, the computer components further comprise: a correlation module configured for: calculating a correlation score for the request message based on attributes of the request message that are related to attributes of other request messages associated with malicious attacks on the web server.

Optionally, the computer components further comprise: an application mapping module configured for: comparing a Uniform Resource Locator (URL) and one or more parameters of the request message with a listing of URLs and parameters known to be subject to malicious attacks; comparing the URL and the one or more parameters of the request message with a listing of URLs and parameters known to be to generate false indications of being malicious request messages, and the composite score is further based in part on the comparisons with the listing of URLs and parameters known to be subject to malicious attacks and the listing of URLs and parameters known to be to generate false indications of being malicious request message.

Optionally, the request message is a hypertext transfer protocol (HTTP) request message.

Embodiments of the present invention are directed to a computer usable non-transitory storage medium having a computer program embodied thereon for causing a suitable programmed system to provide security to a web server hosting at least one web application, by performing the following steps when such program is executed on the system. The steps comprise: receiving a request message from a client device that is addressed to the web server; analyzing the request message to identify potential attack indicators that are present in the request message, each potential attack indicator having a score; calculating a composite score for the request message based in part on: the scores of the potential attack indicators, and a reputation score assigned to the request message that is associated with behavior of the client device relative other client devices sending request message to the web server, and handling the request message in accordance with the composite score.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), virtual machines, and similar systems, workstations, modules and combinations of the aforementioned. The aforementioned "computer" may be in various types, such as a personal computer (e.g. laptop, desktop, tablet computer), or any type of computing device, including mobile devices that can be readily transported from one location to another location (e.g. smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software-based emulation of a computer.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
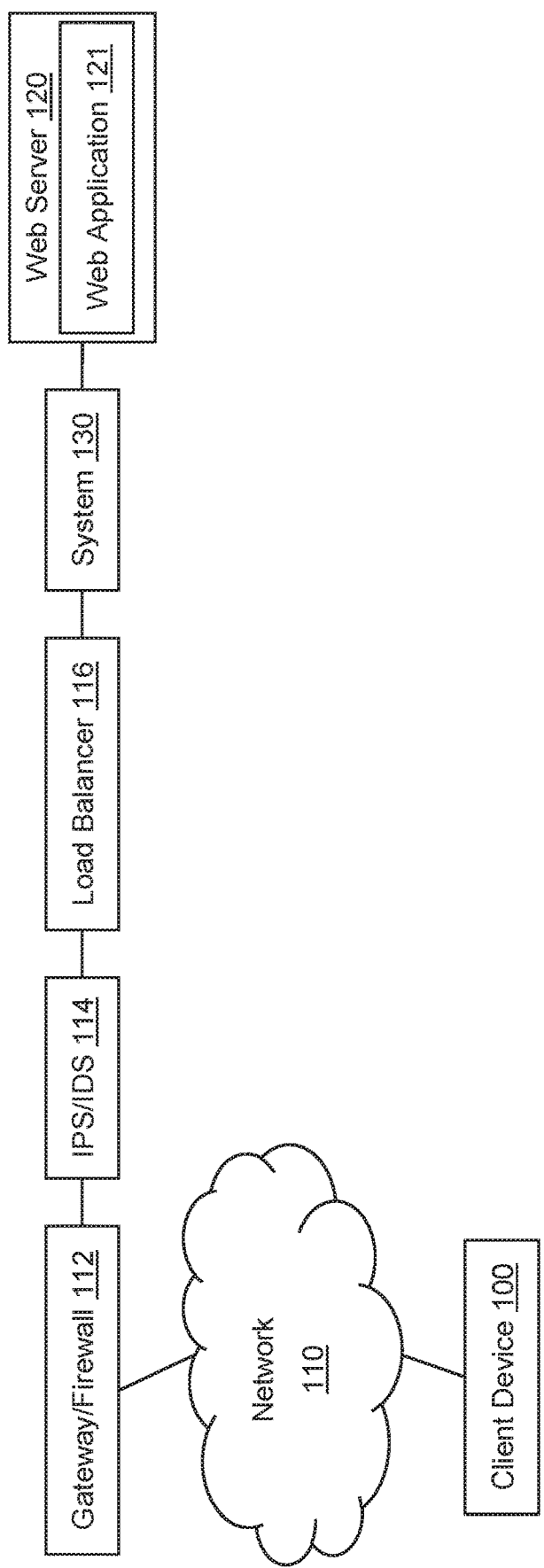
FIG. 1 is a diagram illustrating a non-limiting example environment in which a system according to an embodiment of the present disclosure can be deployed.

The present invention is directed to computerized methods and systems which provide security for web applications.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Initially, throughout this document, references are made to module output scores that are generated/calculated by modules as a result of analysis of data, by said modules. These scores can generally be characterized as likelihood or confidence scores, which define the probability (and interchangeably the likelihood or confidence) that the data being analyzed falls within a specific category. To determine the category, the output scores are evaluated against a threshold criterion, which in certain embodiments is a threshold value. Data that produces output scores that are above (or equal to) the threshold value are placed in a first category, and data that produces output score which are less than the threshold value are placed in a second category. In such embodiments, the higher the output score the higher the probability that the data is be placed in the first category (and the lower the probability that the data is be placed in the second category). Conversely, the lower the output score the higher the probability that the data is be placed in the second category (and the lower the probability that the data is be placed in the first category).

Within the context of this document, the first category is generally defined to be a false-positive (FP) category and the second category is generally defined to be a true-positive (TP), in which analyzed suspicious request messages that produce output scores above (or equal to) a threshold value are categorized as FP, and analyzed suspicious request messages that produce output scores below the threshold value are categorized as TP. This means that suspicious request messages that produce high output scores are likely legitimate request messages and were initially mischaracterized as suspicious, and that suspicious request messages that produce low output scores are likely malicious request messages and were initially correctly characterized as suspicious.

It is noted that the above defined categorization of high output scores corresponding to FP and low output scores corresponding to TP is used in order to better describe the function and operation of the methods and systems of the present disclosure and should not be considered limiting in any way. It is emphasized that embodiments and implementations are possible in which analyzed suspicious request messages that produce output scores above (or equal to) a threshold value are categorized as TP, and analyzed suspicious request messages that produce output scores below the threshold value are categorized as FP.

The present embodiments are applicable to various situations in which clients and servers (e.g., web servers) transfer computer files over a network using a communication protocol, and is of particular value when applied to application layer protocols, specifically HTTP. However, it is noted that the embodiments of the present disclosure may also be applicable to other communication protocols as well, including, for example, network layer protocols such as file transfer protocol (FTP). For conciseness and clarity, the operation and functionality of the methods and systems of the embodiments of the present disclosure will be described within the context of HTTP request and response messages. Such description within the context of HTTP is not intended to limit the scope of the present disclosure in any way, and any references to HTTP throughout this document should apply equally to other communication protocols (e.g., FTP) unless explicitly stated otherwise.

Bearing the above in mind, refer now to FIG. 1, an illustrative example environment in which embodiments of the present disclosure may be performed over a network 110. The network 110 may be formed of one or more networks, including for example, the Internet, cellular networks, wide area, public, and local networks. The embodiments include a computer system 130 (FIG. 3), referred to hereinafter as "the system", that has multiple modules which cooperate to analyze incoming request messages (referred to hereinafter interchangeably as "HTTP requests" or "HTTP request messages") from client computers, represented in FIG. 1 as a client device 100, that are addressed to a web server 120 that hosts one or more web applications, represented in FIG. 1 as a web application 121.

In the illustrative example environment shown in FIG. 1, the system 130 is deployed in the network pipeline between the web server 120 and a load balancer 116. An IPS/IDS 114 (i.e., an intrusion prevention system/intrusion detection system) is deployed between the load balancer 116 and a gateway/firewall 112 (i.e., a firewall installed as part of a gateway) that receives data from, and sends data to, devices (e.g., the client device 100) over the network 110. The example deployment location of the system 130, as shown in FIG. 1, is one of many non-limiting examples of possible deployment locations of the system 130. For example, in certain non-limiting implementations, the system 130 can be implemented as part of a virtual machine for a private cloud deployment as a reverse proxy or a plug-in to a web server (e.g., Apache, Nginx, etc.).

Figure 2:
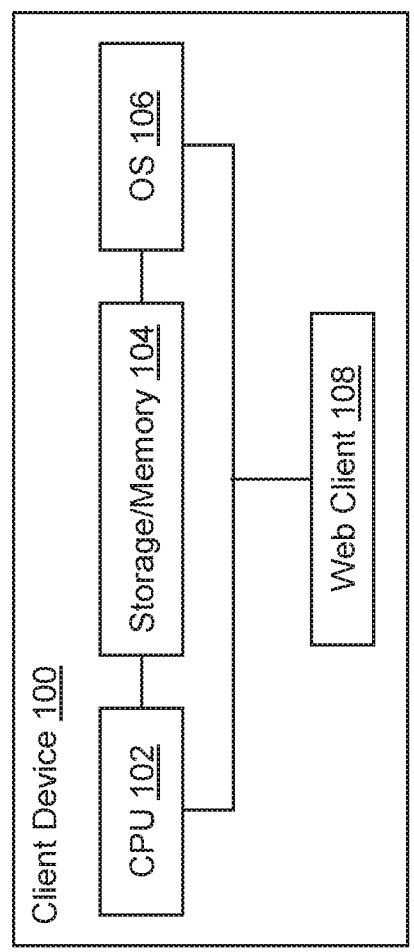
FIG. 2 is a diagram of the architecture of an exemplary client device that sends HTTP requests which are received by the system embodying the present disclosure.

FIG. 2 shows the exemplary client device 100 as an architecture. The client device 100 includes a central processing unit (CPU) 102, a storage/memory 104, an operating system (OS) 106, and a web client 108. The processors of the CPU 102 and the storage/memory 104, although shown as a single component for representative purposes, may be multiple components.

The CPU 102 is formed of one or more processors, including microprocessors, for performing the functions of the client device 100, including executing the functionalities and operations of the web client 108 and the OS 106. The processors are, for example, conventional processors, such as those used in servers, computers, and other computerized devices. For example, the processors may include x86 Processors from AMD and Intel, Xeon® and Pentium® processors from Intel, as well as any combinations thereof.

The storage/memory 104 is any conventional storage media. The storage/memory 104 stores machine executable instructions for execution by the CPU 102. The storage/memory 104 also includes machine executable instructions associated with the operation of the components, including the web client 108.

The OS 106 may include any of the conventional computer operating systems, such as those available from Microsoft of Redmond Wash., commercially available as Windows® OS, such as Windows® XP, Windows® 7, MAC OS from Apple of Cupertino, Calif., or Linux, or may include real-time operating systems, or may include any other type of operating system typically deployed in sandboxed systems as known in the art.

The web client 108 is, for example, any computer system application that can communicate with web servers in order to access data on the world wide web via web servers (such as the web server 120). In a particular non-limiting implementation, the web client 108 is implemented as a web browser. Such web browsers include, but are not limited to, Microsoft® Internet Explorer® and Mozilla Firefox®. Without loss of generality, the term web client and web browser will be used interchangeably throughout the remaining sections of the present disclosure.

Generally speaking, the system 130 is deployed between the web client 108 of the client device 100 and the web server 120, such that the system 130 is able to intercept the HTTP requests sent by the client device 100 that are addressed to the web server 120. As will be discussed in greater detail below, the system 130 analyzes the intercepted HTTP requests and makes recommendations for how to handle the intercepted HTTP requests (e.g., allowing the HTTP request to go through to the web application 121, blocking the HTTP request, etc.) based on the analysis of the HTTP requests.

Figure 3:
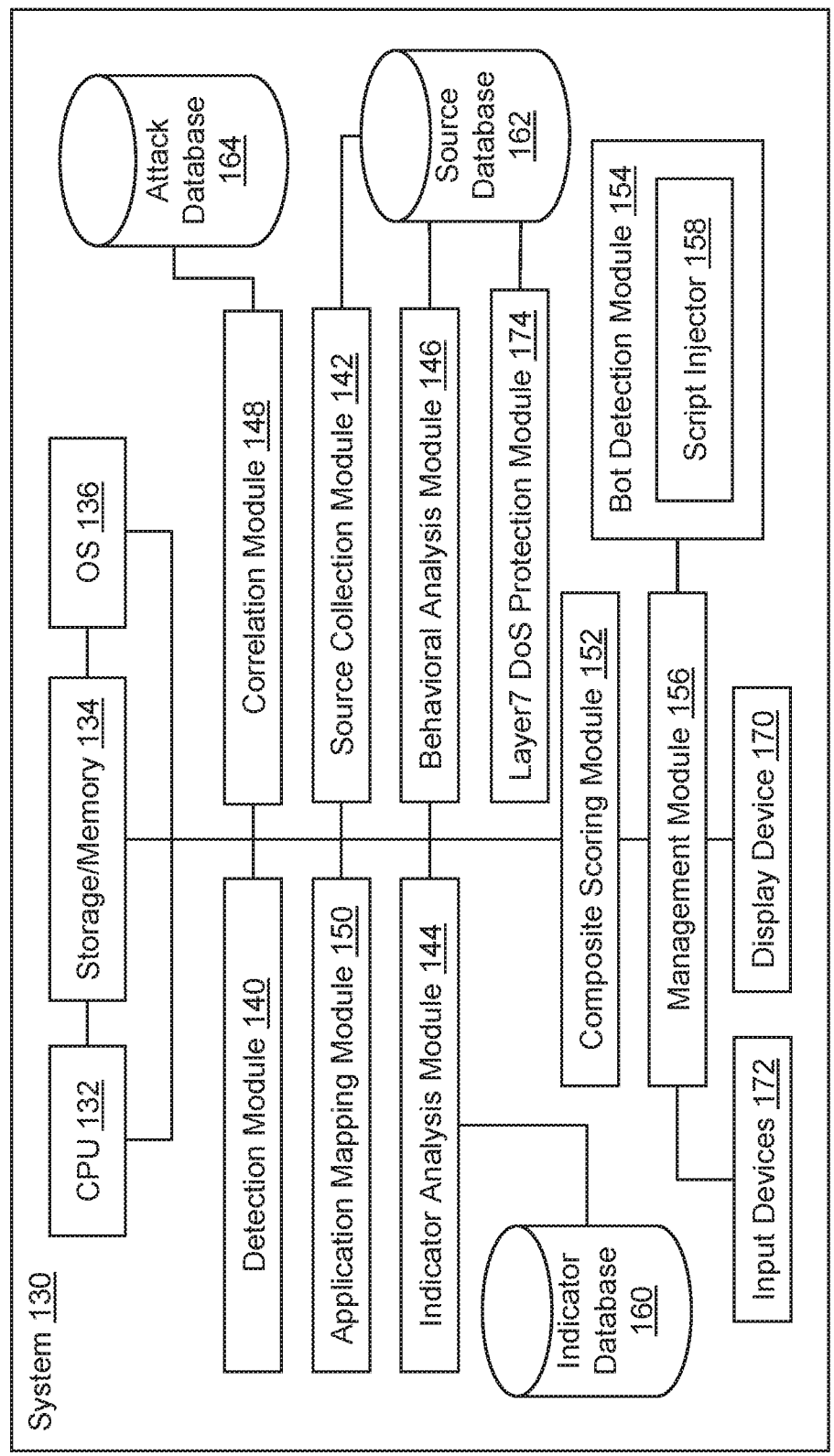
FIG. 3 is a diagram of the architecture of an exemplary system embodying the present disclosure.

FIG. 3 shows the system 130 as an architecture, with various computerized components and modules incorporated therein. Initially, the system 130 includes a CPU 132, a storage/memory 134, and an OS 136. The processors of the CPU 132 and the storage/memory 134, although shown as a single component for representative purposes, may be multiple components. The system 130 further includes a plurality of modules, including a detection module 140, a source collection module 142, an indicator analysis module 144, a behavioral analysis module 146, a correlation module 148, an application mapping module 150, a composite scoring module 152, a bot detection module 154, and a management module 156. As will be discussed in subsequent sections of the present disclosure, the system 130 may also include a Layer7 DoS (Denial of Service) protection module 174.

The system 130 further includes one or more databases, represented in FIG. 3 as an indicator database 160, a source database 162, and an attack database 164. Note that although the databases 160-164 are shown in FIG. 3 as three separate databases, other implementations are possible in which the data entries of the databases 160-164 are stored in a single database.

Figure 4A:
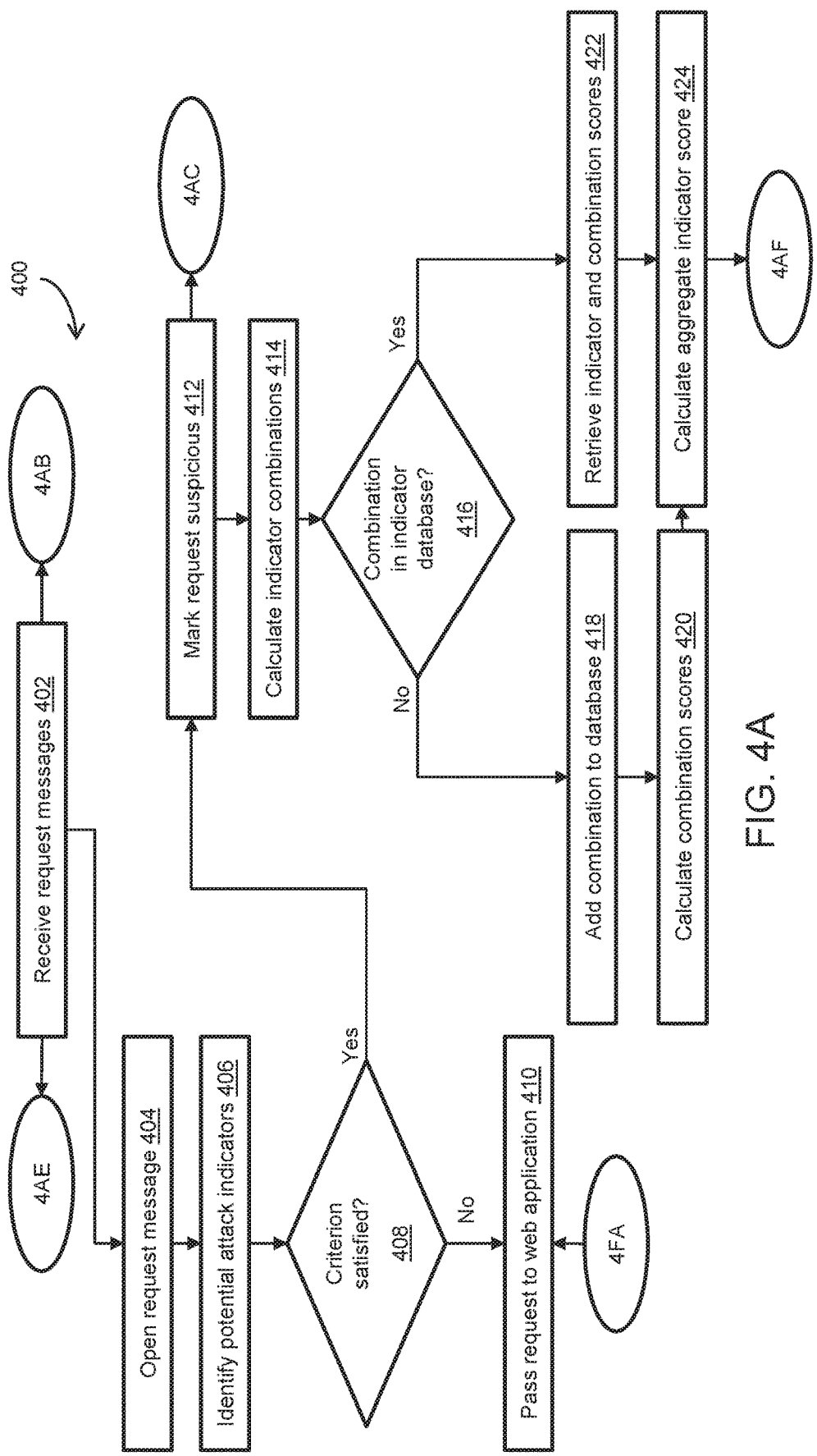
FIGS. 4A-4F are flow diagrams illustrating a process for analyzing and handling request messages according to an embodiment of the present disclosure.
Figure 4C:
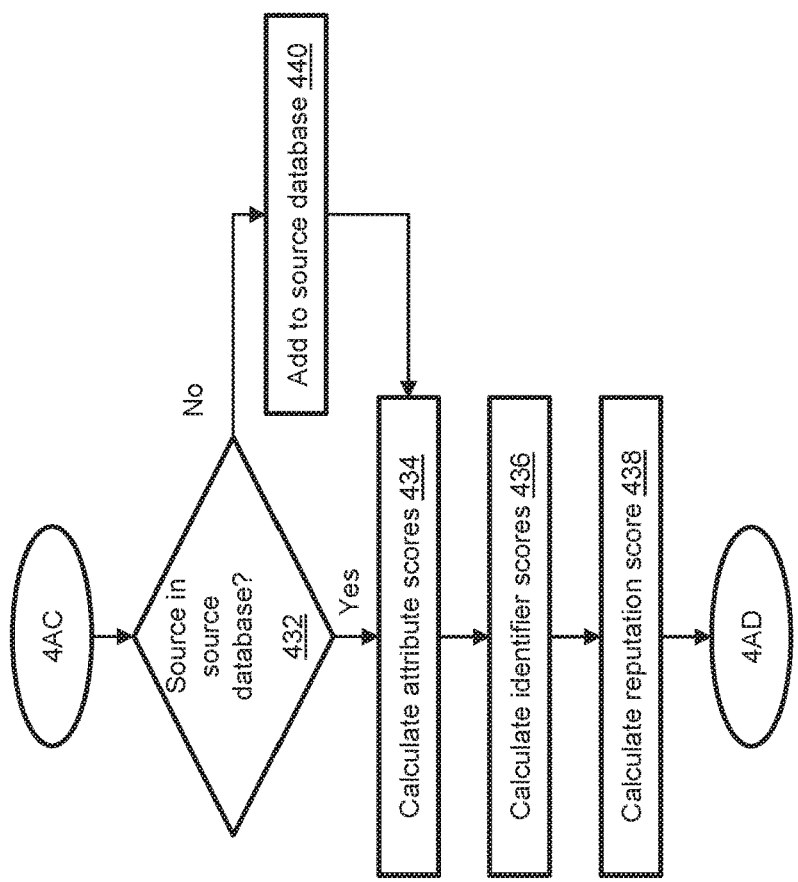
Figure 4B:
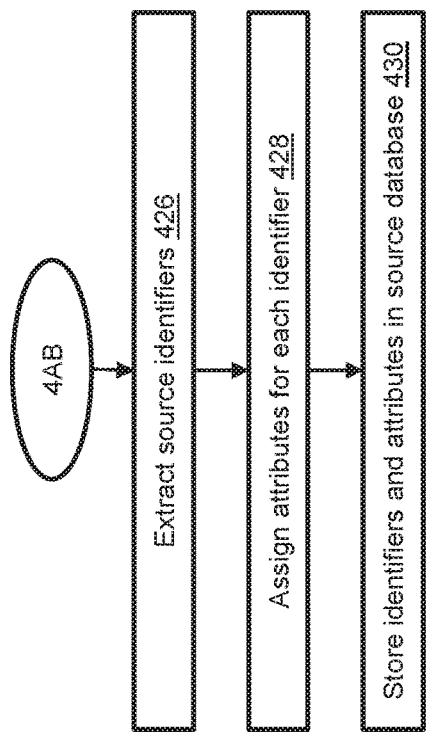
Figure 4D:
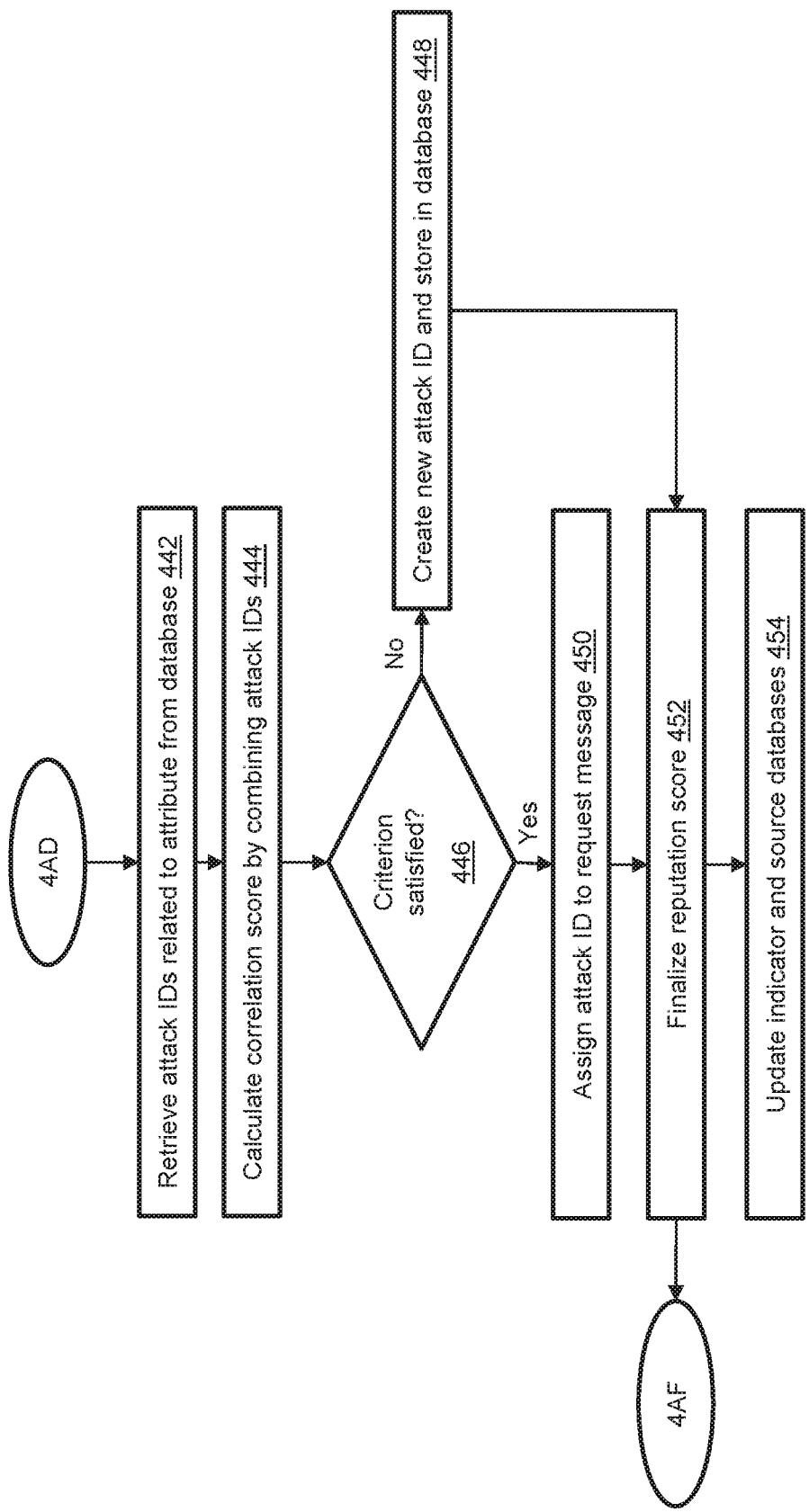
Figure 4E:
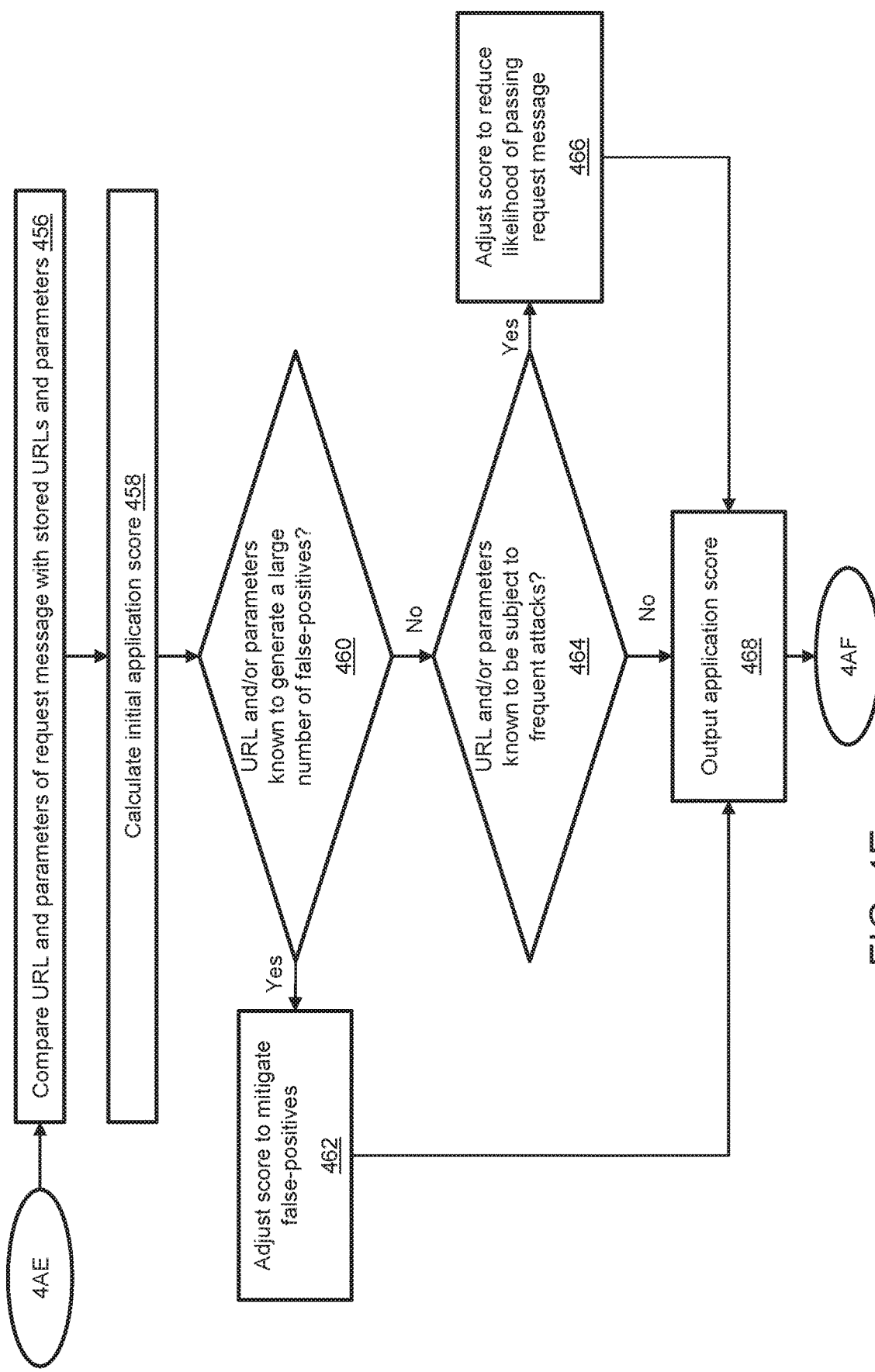
Figure 4F:
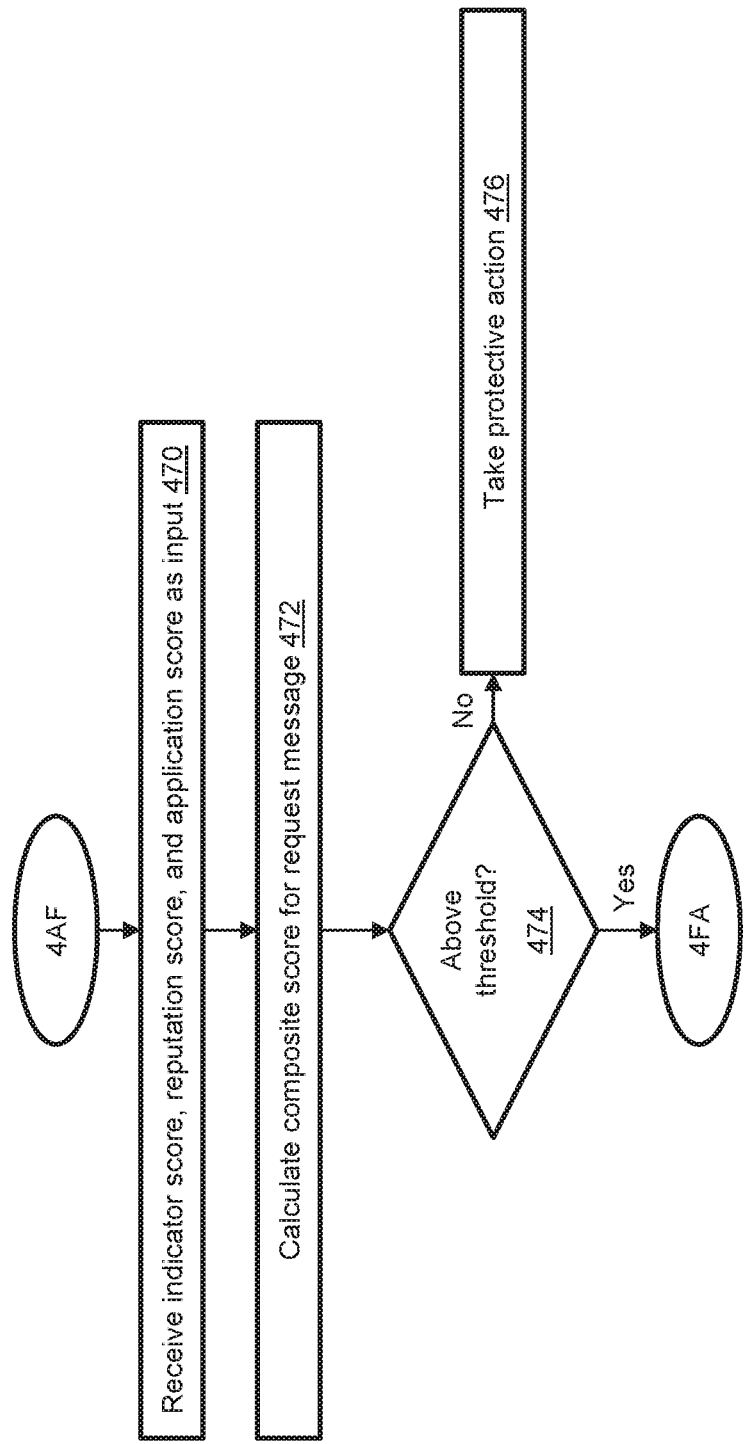
Figure 5:
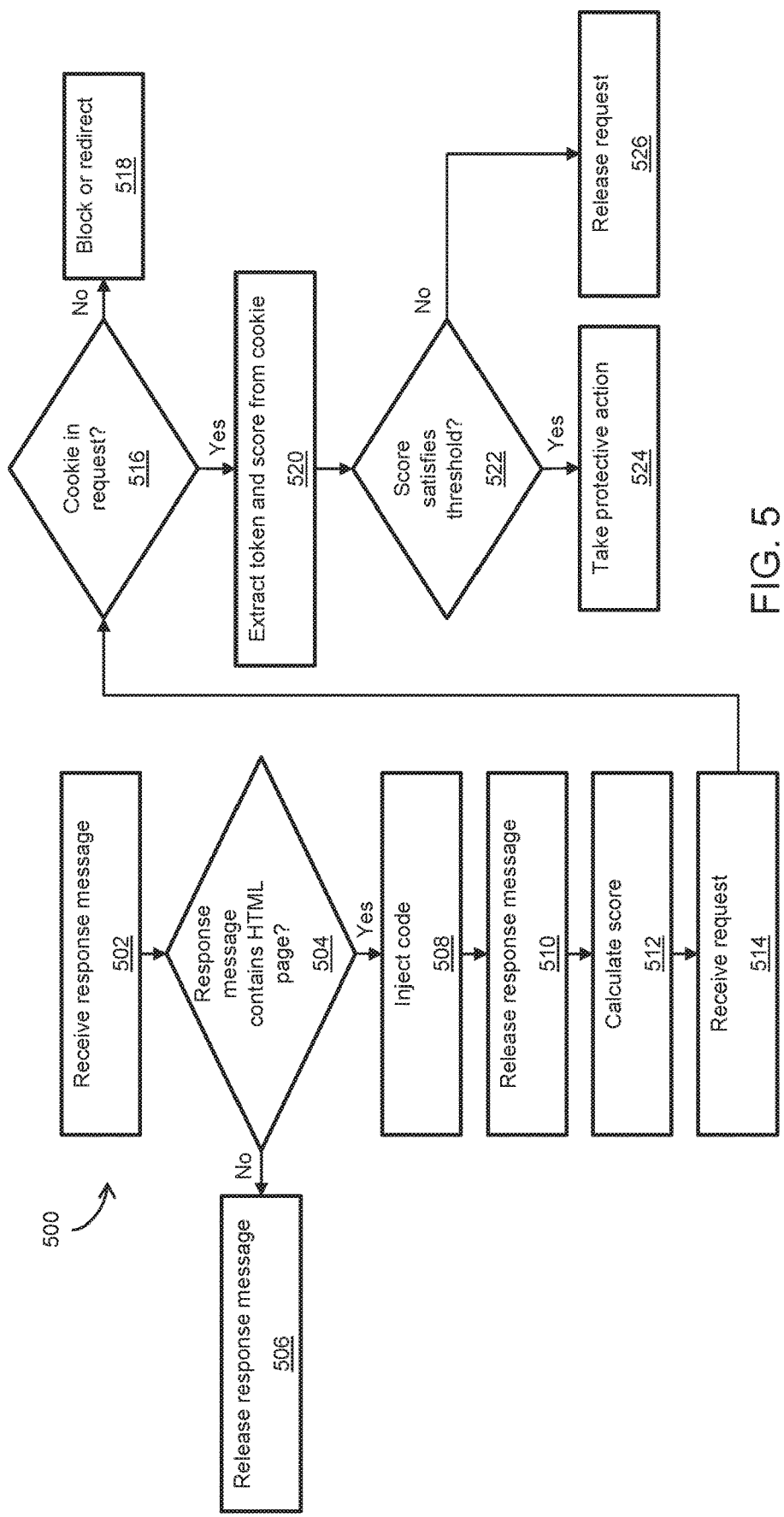
FIG. 5 is a flow diagram illustrating a process for identifying automated request messages according to an embodiment of the present disclosure.

The CPU 132 is formed of one or more processors, including microprocessors, for performing the system 130 functions, including executing the functionalities and operations of the modules 140-156 and 174, as detailed herein, the OS 136, and including the processes shown and described in the flow diagrams of FIGS. 4 and 5. The processors are, for example, conventional processors, such as those used in servers, computers, and other computerized devices. For example, the processors may include x86 Processors from AMD and Intel, Xeon® and Pentium® processors from Intel, as well as any combinations thereof.

The storage/memory 134 is any conventional storage media. The storage/memory 134 stores machine executable instructions for execution by the CPU 132, to perform the processes of the present embodiments. The machine executable instructions stored by the storage/memory 134 also include instructions associated with the operation of the modules 140-156, and all instructions for executing the processes of FIGS. 4 and 5.

The OS 136 may include any of the conventional computer operating systems, such as those available from Microsoft of Redmond Wash. commercially available as Windows® OS, such as Windows® XP, Windows® 7, MAC OS from Apple of Cupertino, Calif. or Linux, or may include real-time operating systems, or may include any other type of operating system typically deployed in sandboxed systems as known in the art.

As mentioned above, the system 130 is deployed between the web client 108 of the client device 100 and the web server 120. The system 130, and its components, may be deployed in various locations along the path between the web client 108 and the web server 120. In certain instances, the deployment location of the system 130 may be application specific, and may be based on, for example, network administrator and/or system administrator requirements. In certain non-limiting implementations, the system 130 is implemented as a virtual machine that is, for example, part of a gateway or firewall that performs network traffic management functions. In other non-limiting implementations, the system 130 is implemented on a computing device (for example as a virtual machine running on the computing device) that is separate from the gateway/firewall but that is linked to the gateway/firewall (for example the gateway/firewall 112 shown in FIG. 1).

In certain non-limiting implementations, all of the components of the system 130 (e.g., the modules 140-156 and 174, the CPU 132, storage/memory 134, the OS 136, and the databases 160-164) are deployed as part of the same physical system. For example, in such implementations, all of the modules 140-156 and 174 may be implemented as modules executed by the same virtual machine which runs on the same gateway/firewall. In other non-limiting implementations, some of the modules 140-156 and 174 may be deployed as part of different respective physical systems. For example, in such implementations, some of the modules 140-156 and 174 may be implemented as modules executed by a virtual machine that runs on the gateway/firewall, which other modules 140-156 and 174 may be implemented on a computing device that is separate from the gateway/firewall.

The embodiments of the present disclosure should not be limited to a single implementation and deployment location of the system 130 thereof. In all implementations of the system 130, the components of the system 130 (e.g., the modules 140-156 and 174, the CPU 132, storage/memory 134, the OS 136, and the databases 160-164) are connected or linked to each other either directly or indirectly thereby enabling data and information sharing between the components of the system 130.

The modules 140-152 cooperate to screen HTTP requests in order to separate legitimate traffic from suspicious traffic, and to assign non-binary scores to suspicious HTTP requests in order to determine a likelihood that suspicious HTTP requests are in fact malicious. The bot detection module 154 is generally functionally separate from the modules 140-152, and provides the system 130 with bot detection capabilities. The Layer7 DoS protection module 174 is also functionally separate from the modules 140-152. The management module 156, as will be discussed in greater detail below, compiles and aggregates outputs from the modules 140-154 and 174, and allows system administrators, that operate the system 130, to adjust various parameters and settings associated with the various modules.

The following paragraphs describe the functionalities and operations of the modules 140-152. The functionalities and operations of the bot detection module 154 and the Layer7 DoS protection module 174 will be described in subsequent sections of the present disclosure.

The detection module 140 is configured to receive (i.e., intercept) HTTP requests, that are sent by client computers (e.g., the client device 100) and are addressed to the web server 120, prior to arrival of the HTTP requests at the web server 120. The detection module 140 analyzes each HTTP request by opening each intercepted HTTP request and breaking or parsing the contents of the HTTP request into subcomponents. Examples of such subcomponents include, but are not limited to, uniform resource locators (URLs), headers, parameter names, parameter values, and web resources (e.g., Hypertext Markup Language (HTML) documents. JavaScript Object Notation (JSON) objects, Extensible Markup Language (XML) documents, etc.). The detection module 140 further analyzes the HTTP requests by scanning the payload of each of the subcomponents in order to identify potential indicators of a malicious attack (referred to hereinafter as "potential attack indicators") that are present in the HTTP request.

As is generally known in the art, a URL is the unique address for a file, a web site or a web page, that is accessible on a network, such as the network 110. HTML is the set of markup symbols or codes inserted in a file intended for display on a web client (e.g., web browser) page. JSON is a file format that utilizes human-readable text to transmit data objects between a web client (e.g., web browser) and a web server. XML is a markup language that defines a set of rules for encoding documents in human-readable and machine-readable format.

Potential attack indicators that are to be identified by the detection module 140 may be, for example, any keyword or keyword strings in text or objects in the scanned payloads that are anomalous or suspicious in nature. Examples of potential attack indicators include, but are not limited to, keywords that are indicative of SQL injection attempts and probing attempts via netcat utility to bypass authentication or encryption (i.e., backdoor entry). For example, the keyword string '105 or 1=1' is indicative of an SQL injection (in the HTTP request) to attempt to gain access to restricted information (for example usernames and/or passwords from a database or table that contains usernames and/or passwords). The following is a list of non-limiting examples of sample portions of suspicious HTTP requests and the potential attack indicators (keyword/keyword strings) associated with each sample:

Sample$_1$:
   ../../../nc −1
Keyword/keyword string from Sample$_1$:
   [u'../', u'/..', u'nc−1', u'os_cmd_high_acuracy_fast_reg_3', u'probing']
Sample$_2$:
   105 or 1 =
Keyword/keyword string from Sample$_2$:
   [u'=', u'or', u'probing', u'regex_sqli_0']
Sample$_3$:
   ../nc −1
Keyword/keyword string from Sample$_3$:
   [u'../', u'nc−1', u'os_cmd_high_acuracy_fast_reg_3', u'probing']
Sample$_4$:
   ../nc
Keyword/keyword string from Sample$_4$:
   [u'../', u'probing']
Sample$_5$:
   ../../../usr/bin/nc −1
Keyword/keyword string from Sample$_5$:
   [u'../', u'/..', u'/bin', u'/usr', u'nc−1', u'os_cmd_high_acuracy_fast_reg_3', u'probing']
Sample$_6$:
   105 or 1 = 1
Keyword/keyword string from Sample$_6$:
   [u'=', u'or', u'probing', u'regex_sqli_0']

The potential attack indicators are evaluated against a decision criterion, which may be set by a system administrator that manages the system 130, to determine whether a criterion is satisfied. In certain embodiments, the decision criterion is a threshold value. In such embodiments, the detection module 140 tallies the number of potential attack indicators in the HTTP request and evaluates the number of potential attack indicators against the threshold value. If the potential attack indicators satisfy the decision criterion (e.g., if number of potential attack indicators exceeds the threshold value), the detection module 140 marks (i.e., flags) the HTTP request as suspicious.

If the potential attack indicators dissatisfy (i.e., do not satisfy) the decision criterion (e.g., if the number of potential attack indicators is less than or equal to the threshold value), the HTTP request is deemed as a legitimate request and is released through to the web application 121 by the system 130. In certain embodiments, the system 130 creates and maintains a cache of payloads from legitimate HTTP requests (i.e., legitimate payloads) in order to improve the efficiency of the detection module 140 by not requiring the detection module 140 to scan legitimate payloads.

As mentioned above, the threshold value may be set by a system administrator. In a common setting, the threshold value is set to one, meaning that the HTTP request is deemed as a legitimate request if no potential attack indicators are found, and that the HTTP request is deemed as a suspicious request if at least one (i.e., one or more) potential attack indicator is found.

In other embodiments, the decision criterion is the presence of one or more attack indicators from a predefined list of attack indicators. The predefined list of attack indicators includes attack indicators that are predefined as being particularly dangerous (i.e., indicative of high risk, or strong indicators). The predefined list of attack indicators may be provided to the system 130 by a module that is external to the system, such as a reputation server or the like. For example, the predefined list may include the attack indicator '105 or 1=', which is a strong indicator of a malicious SQL injection attempt.

Parenthetically, the vast majority of HTTP requests will not have any attack indicators, and will therefore be deemed legitimate requests. However, among the minority group of HTTP requests that include potential attack indicators and are deemed as suspicious requests, the present embodiments provide an efficient solution for handling suspicious or malicious HTTP requests which considerably reduces the amount of computational resources (e.g., resources of the CPU 132, the storage/memory 134, etc.) required to identify and handle suspicious or malicious HTTP requests.

The detector module 140 passes relevant data pertaining to the suspicious HTTP request to other modules of the system 130. The relevant data includes the HTTP request itself, the subcomponents (and associated payloads thereof) of the HTTP request, and all of the potential attack indicators identified by the detection module 140.

The indicator analysis module 144 generates a list of combinations of potential attack indicators from the potential attack indicators (in the data received from the detector module 140). In a non-limiting implementation, the combinations are generated by looking at pairwise combinations of the potential attack indicators (i.e., N choose 2 combinations, where N is the number of potential attack indicators). For example, if the detection module 140 identifies three potential attack indicators labeled as Indicator $IN_A$, Indicator $IN_B$, and Indicator $IN_C$, the indicator analysis module 144 generates three combinations, listed as follows: (Indicator $IN_A$, Indicator $IN_B$), (Indicator $IN_A$, Indicator $IN_C$), and (Indicator $IN_B$, Indicator $IN_C$).

Information pertaining to the potential attack indicators and the combinations thereof are stored in the indicator database 160. Specifically, the indicator database 160 stores the following data: the list of potential attack indicators, a non-binary score associated with each potential attack indicator, a list of possible combinations of potential attack indicators, and a non-binary score for each combination of potential attack indicators. In certain non-limiting implementations, the score of a data object and the likelihood that the data object is malicious have a monotonically decreasing relationship. For example, in such implementations, a high score of a data object corresponds to a low likelihood that the data object is malicious, and a low score of a data object corresponds to a high likelihood that the data objects is malicious. In other non-limiting implementations, the score of a data object and the likelihood that the data object is malicious have a monotonically increasing relationship. For example, in such implementations, a high score of a data object corresponds to a high likelihood that the data object is malicious, and a low score of a data object corresponds to a low likelihood that the data objects is malicious.

The data maintained in the indicator database 160 is adjusted as the system 130 continues to operate. For example, the scores of the potential attack indicators, the list of possible combinations of potential attack indicators, and the scores for each combination of potential attack indicators are adjusted automatically by the system 130 as the system 130 continues to operate.

Initially, the indicator database 160 is populated with scores received from an indicator collection module (not shown), which analyzes suspicious web traffic, for example historical suspicious web traffic, to compile a list of common indicators and associated baseline scores, which may be assigned to the indicators based on a scoring distribution algorithm.

After the list of combinations is generated, for a particular suspicious HTTP request, the indicator analysis module 144 queries the indicator database 160 to check whether each combination in the list exists in the indicator database 160. For each particular combination that is in the indicator database 160, the indicator analysis module 144 retrieves (from the indicator database 160) the non-binary score for the particular combination, as well as the individual scores associated with the potential attack indicators in the particular combination, from the indicator database 160.

If a particular combination is absent from the indicator database 160, the database is updated to include the particular combination. The indicator analysis module 144 then retrieves the individual scores associated with the potential attack indicators in the new combination from the indicator database 160. The indicator analysis module 144 then generates a combined non-binary score for the new combination based on the retrieved individual scores and stores the combined score in the indicator database 160. The combined score may be generated according to a specialized algorithm, for example, a weighted averaging algorithm.

The indicator analysis module 144 calculates an aggregate non-binary indicator score based on all of the combination scores for the HTTP request. The aggregate non-binary indicator score is input to the composite scoring module 152 (along with inputs from the behavioral analysis module 146 and the application mapping module 150) to produce a composite non-binary score, as will be discussed in subsequent sections of the present disclosure.

In certain embodiments, once the detection module 140 marks (i.e., flags) the HTTP request as suspicious, the behavioral analysis module 146 begins executing functionality. For each HTTP request marked (i.e., flagged) as suspicious by the detection module 140, the behavioral analysis module 146 analyzes the HTTP request to make determinations about the HTTP request based on the behavior of the source (i.e., the client device 100) that sent the suspicious HTTP request. The analysis is performed in cooperation with the source collection module 142, which collects information about sources (i.e., client computers) that send HTTP requests. In particular, the source collection module 142 analyzes incoming HTTP requests to extract information pertaining to the sources sending the requests, and subsequently stores the extracted information as entries in a source database 162. In this way, the source collection module 142 compiles web traffic data (i.e., builds up a history) and stores the historical data in the source database 162, as will be discussed in greater detail below.

The source collection module 142 initially retrieves data from particular fields of the HTTP requests in order to extract source identifiers (that correspond to the particular fields) from the source information associated with each HTTP request. Examples of such source identifiers include, but are not limited to, the IP address of the source, the User-Agent, client computer fingerprint, session ID, and combinations thereof. For each particular source identifier, the source collection module 142 assigns attributes to the source identifier which contain data and information related to the behavior of the source. The attributes include, for example, site coverage, request ratio, vulnerable URL request activity, and response time anomalies (e.g., the elapsed time between receiving an HTTP request and sending an HTTP response message).

The site coverage attribute contains data and information that includes the percentage (or fraction or ratio) of common URLs visited by a specific source when browsing the common URLs. Without loss of generality, a "common URL" is defined to be a URL that is typically visited by legitimate users. Examples of common URLs include, http://www.google.com, http://www.facebook.com, http://www.ebay.com, http://www.youtube.com, http://en.wikipedia.org, and http://www.amazon.com. Typically, legitimate users visit various portions/sections of the URL in the web application 121 when browsing the common URL. For example, legitimate users will typically navigate to various sections of the URL by clicking on various hyperlinks throughout the URL page. Legitimate users may also often input user specific information. e.g., user login information, in particular when accessing e-mail, banking, and social media URLs. In contrast, malicious users (i.e., attackers) typically do not navigate URLs with the same prevalence as legitimate users.

The request ratio attribute contains data and information that includes the ratio between the number of legitimate HTTP requests performed by a specific source and the number of malicious HTTP requests performed by the same source. As should be apparent, the higher the ratio, the greater the confidence that the source is a legitimate source. Note that the inverse ratio may also be stored or calculated. In such configurations, the smaller the ratio, the greater the confidence that the source is a legitimate source.

The vulnerable URL request activity attribute contains data and information related to HTTP requests sent by the user to known vulnerable URLs. The source collection module 142 may be provided with a list of URLs having known security vulnerabilities by an external security system. The list may include URLs that have, for example, non-secured cryptographic storage, security misconfigurations, broken session management, and the like, and/or that have been, or are currently being, subjected to SQL injection, cross site scripting, and the like.

The response time anomalies attribute contains data and information related to latencies generated by the source making the HTTP request. Sources that cause latencies which are markedly higher than the average response generated by legitimate sources can be immediately blocked or presented with a captcha challenge by the system 130. The response time attribute may also be used to identify and mitigate application layer denial of service (DoS) attacks, as will be discussed in subsequent sections of the present disclosure.

The source collection module 142 collects all of the source identifiers and associated attributes, and stores the source identifiers and attributes in the source database 162. As a result, the source database 162 stores information about all of the sources that have made HTTP requests, wherein for each source associated with a particular HTTP request, each source identifier of that source is stored in the source database 162 together with all of the attributes associated with each respective source identifier. The source entries in the source database 162 can also be marked (i.e., flagged) with a legitimacy score. For example, sources that have made only legitimate HTTP requests can be marked (i.e., flagged) with a high score in the source database 162, thereby indicating that such sources are legitimate sources.

Returning now to the behavioral analysis module 146, for each HTTP request marked (i.e., flagged) as suspicious by the detection module 140, the behavioral analysis module 142 queries the source database 162 to retrieve the source identifiers for the particular source that has made the suspicious HTTP request. If the source is not in the source database 162, the behavioral analysis module 146 updates the source database 162 by inserting the source (and the relevant source identifiers and attributes) into the source database 162.

Note that initially (i.e., upon initial execution of the functionality of the system 130) the suspicious source will be absent from the source database 162. This is due to the fact that the behavioral analysis module 146 and the source collection module 142 collect information over time as client computers make HTTP requests. Once the behavioral analysis module 146 and the source collection module 142 have collected a sufficient amount of historical data, the source database 162 will return the source identifiers (to the behavioral analysis module 146) for the particular source that has made the suspicious HTTP request.

Once the behavioral analysis module 146 retrieves the relevant information from the source database 162, the behavioral analysis module 146 performs attribute comparisons to calculate non-binary attribute scores and non-binary source identifier scores. Specifically, for each source identifier, the behavioral analysis module 146 compares each attribute to like attributes of legitimate sources (from the source database 162) to calculate attribute scores. The behavioral analysis module 146 then combines all of the attribute scores, for the particular source identifier, to calculate a non-binary source identifier score. The behavioral analysis module 146 then combines all of the source identifier score to calculate a non-binary reputation score for the particular HTTP request. The aforementioned source identifier score and reputation score may be generated according to a specialized algorithm, for example, a weighted averaging algorithm.

If the reputation score is above a threshold value, the behavioral analysis module 146 classifies the HTTP request as a legitimate request, and marks (i.e., flags) the HTTP request as a false-positive (referred to hereinafter as "FP"). If the reputation score is below the threshold value, the behavioral analysis module 146 maintains the classification of the HTTP request as a suspicious request, and marks (i.e., flags) the HTTP request as a true-positive (referred to hereinafter as "TP"). The FP/TP marking (i.e., flag), together with the reputation score, are used by the indicator analysis module 144 to update the score entries in the indicator database 160. In other words, the indicator analysis module 144 updates (i.e., adjusts) the scores of the potential attack indicators and the scores for the combinations of potential attack indicators associated with that particular HTTP request, based on the reputation scores and the FP/TP markings (i.e., flags).

For example, if a high score in the indicator database 160 corresponds to a low likelihood that the HTTP request is malicious, and if the behavioral analysis module 146 outputs a high reputation score for the HTTP request, the indicator score and combination scores in the indicator database 160 are raised (thereby decreasing the likelihood that the HTTP request is malicious). Likewise, if a high score in the indicator database 160 corresponds to a low likelihood that the HTTP request is malicious, and if the behavioral analysis module 146 outputs a low reputation score for the HTTP request, the indicator score and combination scores in the indicator database 160 are lowered (thereby increasing the likelihood that the HTTP request is malicious).

According to certain embodiments, the reputation scores produced by the behavioral analysis module 146 are adjusted based on inputs from the correlation module 148. In a non-limiting implementation, the correlation module 148 may be tasked to run (by the CPU 132) before the behavioral analysis module 146 outputs final reputation scores so as to produce non-binary output which can be used to adjust the reputation scores. The behavioral analysis module 146 may output interim reputation scores, and the output produced by the correlation module 148 can be used to modify the interim reputation scores in order to generate the final reputation scores. The final reputation scores are used by the indicator analysis module 144 to update the score entries in the indicator database 160. The final reputation scores are used as input to the composite scoring module 152 (along with inputs from the indicator analysis module 146 and the application mapping module 150).

In another non-limiting implementation, the reputation scores produced by the behavioral analysis module 146 may be stored in a reputation database (not shown) that is linked to the behavioral analysis module 146 and the correlation module 148, and the correlation module 148 may retrieve the reputation scores from the reputation database and modify the retrieved scores based on the output produced by the correlation module 148. The correlation module 148 may then store the modified reputation scores in the reputation database and send the modified reputation scores to the indicator analysis module 144.

In order to produce output to adjust the scores produced by the behavioral module 146, the correlation module 148 is configured to detect patterns in HTTP requests that are common with, or related to, the attack patterns of previous or ongoing attacks. Specifically, the correlation module 148 analyzes attributes of the suspicious HTTP request in order to identify previous or ongoing attacks related to those specific attributes and parameters. The attributes of the HTTP request may include, for example, source identifiers (e.g., the IP address of the source that sent the HTTP request), the User-Agent, the list of potential attack indicators (identified by the detection module 140), and the like. The attributes analyzed by the correlation module 148 are preferably provided to the correlation module 148 by the detection module 140. The correlation module 148 analyzes the attributes by performing various functions, including querying the attack database 164, calculating non-binary correlation scores based on the results returned by the attack database 164, and evaluating the correlation scores against threshold criteria.

Specifically, for each attribute, the correlation module 148 queries the attack database 164 to retrieve information related to that particular attribute. Note that initially the attack database 164 is empty or filled with null values. As the system 130 continues to run, and receives HTTP requests, the correlation module 148 builds up the attack database 164 with non-null entries. For the purposes of properly explaining the functions of the correlation module 148, it is assumed that the system 130 has been running for a sufficient amount of time such that the attack database 164 has been built up to include several non-null entries.

In response to the query, the attack database 164 returns a list of attacks related to the particular attribute in the query. For example, if the attribute in the query is the list of potential attack indicators, the attack database 164 returns a list of attacks (by attack IDs) related to those potential attack indicators. The correlation module 148 continues to query the attack database 164 for each attribute. As a result, the attack database 164 returns multiple lists of attack IDs, with each list of attack IDs related to a different specific attribute.

The correlation module 148 combines the lists of attack IDs, per attack ID, to calculate a non-binary correlation score for each attack ID. The correlation scores are evaluated against a threshold criterion (e.g., a threshold value) to determine whether the suspicious HTTP request is related to any of the attack IDs in the attack database 164, or whether the suspicious HTTP request constitutes a new attack to be assigned a new attack ID. For example, if none of the attack IDs have a correlation score above a minimum threshold value, a new attack ID is created for the suspicious HTTP request, and the correlation module 148 stores the new attack ID in the attack database 164 together with the attributes of the HTTP request.

If one or more of the attack IDs have a correlation score that is greater than or equal to the minimum threshold value, the correlation module 148 assigns the attack ID with the highest correlation score to the suspicious HTTP request.

The correlation score of the HTTP request is used, either by the behavioral analysis module 146 or the correlation module 148, to update (i.e., modifies/adjusts) the "interim" reputation scores output by the behavioral analysis module 146. For example, the correlation module 148 may evaluate the correlation score against a FP/TP threshold criterion, such that the HTTP request is considered a FP if the correlation score is greater than or equal to a FP/TP threshold value, and is considered a TP if the correlation score is less than the FP/TP threshold value. The "interim" reputation scores may then be adjusted in the FP or TP direction based on the correlation scores.

In order to better explain the operation of the correlation module 148, the following case is considered as an example. In the example, the suspicious HTTP request has two attributes and the attack database 164 stores four attacks. The attributes of the suspicious HTTP request are: a) the list of potential attack indicators and, b) the IP address of the source that sent the suspicious HTTP request. The four attacks in the attack database 164 are denoted by Attack $ID_1$, Attack $ID_2$, Attack $ID_3$, and Attack $ID_4$. Attack $ID_1$ has assigned to it the following attributes: a) one or more potential attack indicators common to the indicators in the list of potential attack indicators in the suspicious HTTP request, and b) an IP address that is different from the IP address of the source that sent the suspicious HTTP request. Attack $ID_2$ has assigned to it the following attribute: User-Agent that is different from the User-Agent of the suspicious HTTP request. Attack $ID_3$ has assigned to it the following attribute: User-Agent that is different from the User-Agent of the suspicious HTTP request. Attack $ID_4$ has assigned to it the following attribute: one or more potential attack indicators common to the indicators in the list of potential attack indicators in the suspicious HTTP request. In such an example case, in response to the query related to the list of potential attack indicators, the attack database 164 will return a first list having the attacks denoted by Attack $ID_1$ and Attack $ID_4$. In response to the query related to the IP address of the source that sent the suspicious HTTP request, the attack database 164 will return a second list having the attack denoted by Attack $ID_1$.

For Attack ID, and Attack $ID_4$, the correlation module 148 will calculate a score based on the two lists. For Attack $ID_2$ and Attack $ID_3$ the correlation module 148 will return low (i.e., zero) scores, since Attack $ID_2$ and Attack $ID_3$ have no attributes in common with the suspicious HTTP request. Since Attack $ID_1$ has more attributes in common with the suspicious attack than Attack $ID_4$, the correlation module 148 calculates a higher score for Attack ID, than for Attack $ID_4$.

As mentioned above, the composite scoring module 152 receives input from the indicator analysis module 144, the behavioral analysis module 146, and the application mapping module 150. The composite scoring module 152 receives such inputs from the indicator analysis module 144, the behavioral analysis module 146, and the application mapping module 150 in the form of non-binary scores. In order to calculate a non-binary score, the application mapping module 150 analyzes the URLs and parameters in intercepted HTTP requests in order to identify URLs and parameters of the web server 120 that cause frequent FP markings (by the behavioral analysis module 146 for example) or that are subject to frequent attacks.

Generally speaking, the parts of the URL of the HTTP request are found in one of the header lines of the request and in the path of the request line. Within the context of this document, the "parameters" of the HTTP request are generally defined to be all of the components of the HTTP request excluding the URL. For example, the parameters of the HTTP request may include, but are not limited to, header line keys, such as, User-Agent, and message body content.

Specifically, the application mapping module 150 analyzes the URLs and parameters of the intercepted HTTP requests and compares the URLs and parameters of the HTTP request with stored URLs and parameters from other HTTP requests, for example, previous HTTP requests intercepted by the system 130. The stored URLs and parameters of the other HTTP requests are either URLs and parameters which are known to the system 130 to be attacked frequently, or are known to the system 130 to generate a large number of FP markings (i.e., flags). For example, the attack database 164 may store, as attributes for each attack ID, the URL and parameters of the HTTP request of that attack ID. Similarly, the indicator database 160 may store, along with the URL and parameter attack indicators, an indication of FP or TP based on input from the behavioral analysis module 146.

The application mapping module 150 compares the URL and parameters of the suspicious HTTP request with the stored URLs and parameters that are known to be attacked frequently. The application mapping module 150 also compares the URL and parameters of the suspicious HTTP request with the stored URLs and parameters known to generate a large number of FP markings (i.e., flags). The application mapping module 150 assigns a non-binary application score to the HTTP request based on the outcome of the aforesaid comparisons. The application mapping module 150 may calculate an initial application score, and adjust the application score (either higher or lower) based on the outcome of the comparisons with the stored URLs and parameters that are known to be attacked frequently and the stored URLs and parameters known to generate a large number of FP markings (i.e., flags).

Specifically, if either or both of the URL and parameters of the HTTP request are found to be in common with the stored URLs and parameters that are known to be attacked frequently, the application score is adjusted (or assigned) in order to reduce the likelihood that the HTTP request will be passed through to the web server 120. Likewise, if either or both of the URL and parameters of the HTTP request are found to be in common with the stored URLs and parameters that are known to generate a large number of FP markings (i.e., flags), the application score is adjusted (or assigned) in order to mitigate FP by reducing the likelihood that the system 130 will block the client device 100 from accessing the web server 120.

In a non-limiting implementation, a low application score corresponds to a high likelihood of the HTTP request being malicious, and therefore reduces the likelihood that the system 130 will pass the HTTP request through to the web server 120 (i.e., increases the likelihood that the system 130 will block or redirect the HTTP request). Similarly, in such a non-limiting implementation, a high application score corresponds to a low likelihood of the HTTP request being malicious, and therefore increases the likelihood that the system 130 will pass the HTTP request through to the web server 120 (i.e., decreases the likelihood that the system 130 will block or redirect the HTTP request).

Note that the URLs and parameters known to be subject to frequent attacks may also be provided to the system 130 by an external network security device or service, for example the IPS/IDS 114.

As mentioned above, the composite scoring module 152 receives input from the indicator analysis module 144, the behavioral analysis module 146, and the application mapping module 150 to produce a composite non-binary score. Specifically, the composite scoring module 152 receives the aggregate indicator score from the indicator analysis module 144, the final reputation score from the behavioral analysis module 146, and the application score from the application mapping module 150. It is noted that all of the scores received by the composite scoring module 152 are non-binary scores, meaning that the scores can take on more than two values (i.e., the scores are not limited to '0' and '1', or 'False' and 'True' values). The non-binary scores can take on values between a minimum value $S_{min}$ and a maximum value $S_{max}$. Note that the values of $S_{min}$ and $S_{max}$ may be different for each of the indicator analysis module 144, the behavioral analysis module 146, and the application mapping module 150.

Generally speaking, the scoring range for the indicator analysis module 144, the behavioral analysis module 146, and the application mapping module 150 can be interpreted as distribution functions (i.e., probability distribution functions), whereby the closer a score is to $S_{min}$ the higher the likelihood (or probability) that the HTTP request is malicious (and conversely the lower the likelihood or probability that the HTTP request is legitimate), and the closer a score is to $S_{max}$ the higher the likelihood (or probability) that the HTTP request is legitimate (and conversely the lower the likelihood or probability that the HTTP request is malicious).

In certain non-limiting implementations, the non-binary scores are limited to non-negative integer values. Accordingly, in such implementations, the non-binary scores can take on integer values between 0 and $S_{max}$ (inclusive). As such, a score of 0 corresponds to the highest confidence level that the HTTP request is malicious, and a score of $S_{max}$ corresponds to the highest confidence level that the HTTP request is legitimate.

The composite scoring module 152 calculates the composite non-binary score by logically combining the scores received from indicator analysis module 144, the behavioral analysis module 146, and the application mapping module 150 so as to combine the distribution functions of the aforementioned modules. The combination process may include, for example, normalization and multiplication, as well as value averaging, in order to produce the composite non-binary score.

It is important to note that many of the aforementioned modules influence each other to update respective scores, and that the scores evolve based on the past operation (i.e., history) of the system 130. Furthermore, certain modules rely on data that is built up over time and stored in one or more databases of the system 130, and may not be able to produce valid scores during the initial execution period of the system 130. For example, the behavioral analysis module 146 relies on historical data in the source database 162 in order to produce reputation scores. However, during the initial execution period of the system 130, the source database 162 may be empty or not contain enough data records (i.e., source collection module 142 may not yet have collected source information) to allow the behavioral analysis module 146 to calculate reputation scores. For example, for the first HTTP request received by the system 130, the source database 162 will be empty and therefore the behavioral analysis module 146 will not have any past knowledge.

In instances in which one or more of the indicator analysis module 144, the behavioral analysis module 146, and the application mapping module 150 is unable to produce a valid score, the composite scoring module 152 may use a dummy or neutral score for that/those module/s. For example, for the first HTTP request, the composite scoring module 152 may use a neutral score as the reputation score for the behavior analysis module 146. The neutral score may be defined as the mean value of the non-binary scoring range (e.g., $0.5*(S_{min}+S_{max})$).

Upon calculating the composite score, the composite scoring module 152 evaluates the composite score against a threshold criterion, for example a threshold value. If the composite score is greater than or equal to the threshold value, the system 130 deems the HTTP request as a legitimate request, and releases the HTTP request through to the web application 121. If the composite score is less than the threshold value, the system 130 deems the HTTP request as a malicious request, and takes protective action, for example by blocking the HTTP request or redirecting the web client 108 to a homepage.

Attention is now directed to FIGS. 4A-4F which shows a flow diagram detailing a computer-implemented process 400 in accordance with embodiments of the disclosed subject matter. This computer-implemented process includes an algorithm for providing web security by analyzing and handling HTTP requests. Reference is also made to the elements shown in FIGS. 1-3. The process and sub-processes of FIGS. 4A-4F are computerized processes performed by the system 130 including, for example, the CPU 132 and associated components, such as the detection module 140, the source collection module 142, the indicator analysis module 144, the behavioral analysis module 146, the correlation module 148, the application mapping module 150, and the composite scoring module 152. The aforementioned processes and sub-processes are for example, performed automatically, but can be, for example, performed manually, and are performed, for example, in real time.

The process 400 begins at block 402, where the system 130, and more specifically the detection module 140, receives (i.e., intercepts) HTTP requests from client computers addressed to the web server 120. In block 404 the detection module 140 opens a received HTTP request (referred to hereinafter as an instant HTTP request) and breaks/parses the contents of the instant HTTP request into subcomponents (e.g., URL, headers, parameter names, parameter values, etc.). The process 400 then moves to block 406, where the detection module 140 scans the payloads of the subcomponents in order to identify potential attack indicators that are present in the instant HTTP request. In block 408, the detection module 140 checks whether a decision criterion is satisfied. For example, the detection module 140 may check whether the number of potential attack indicators is greater than a threshold value. If the decision criterion is not satisfied, e.g., if no potential attack indicators (or not enough potential attack indicators) are present in the instant HTTP request, the process 400 moves from block 408 to block 410, where the system 130 releases the instant HTTP request through to the web server 120. If the decision criterion is satisfied (e.g., if enough potential attack indicators are present), the process 400 moves from block 408 to block 412, where the detection module 140 marks (i.e., flags) the instant HTTP request as suspicious (referred to hereinafter as a suspicious HTTP request). From block 412, the process moves to blocks 414 and 432.

In block 414, the system 130, and more specifically the indicator analysis module 144, calculates a list of combinations of potential attack indicators from the potential attack indicators received from the detection module 140. The process 400 then moves to block 416, where for each combination, the indicator analysis module 144 queries the indicator database 160 to check whether the combination is in the indicator database 160. If the combination is present in the indicator database 160, the process 400 moves from block 416 to block 422, where the indicator analysis module 144 retrieves: a) the indicator scores of the potential attack indicators in the combination, and b) the combination score for the combination. If the combination is absent from the indicator database 160, the process 400 moves from block 416 to block 418, where the indicator analysis module 144 updates the indicator database 160 to include the new combination. The indicator analysis module 144 also retrieves the indicator scores of the potential attack indicators in the new combination from the indicator database 160. The process 400 may in parallel or subsequently move to block 420, where the indicator analysis module 144 calculates the combination score for the new combination, based on the retrieved indicator scores of the potential attack indicators in the new combination. In block 420, the indicator analysis module 144 also stores the combined score in the indicator database 160.

From blocks 420 and 422, the process 400 moves to block 424. In block 424, the indicator analysis module 144 calculates an aggregate indicator score based on all of the combination scores for the suspicious HTTP request. The aggregate score for the suspicious HTTP request is used as input for the composite scoring module 152 in block 470.

In parallel to blocks 404-424, the process 400 also executes blocks 426-430. In block 426, the system 130, and more specifically the source collection module 142, extracts source identifiers (e.g., IP address, User-Agent, client computer fingerprint, session ID, etc.) from the HTTP requests. In block 428, for each particular source identifier, the source collection module 142 assigns attributes (e.g., site coverage, request ratio, vulnerable URL request activity, and response time anomalies) to the source identifier. In block 430, the source collection module 142 stores each source identifier, together with its assigned attributes, in the source database 162, as a data record. As discussed in detail above, and as will be discussed below with reference to blocks 432-438, the source database 162 is used by the behavioral analysis module 146.

As mentioned above, the process 400 also moves to block 432 from block 412 (i.e., once the detection module 140 marks (i.e., flags) the instant HTTP request as suspicious in block 412, the behavioral analysis module 146 begins executing functionality). In the block 432, the behavioral analysis module 146 queries the source database 162 to retrieve the source identifiers for the particular source that has made the suspicious HTTP request. If the source is absent from the source database 162, the process 400 moves from block 432 to block 440, where the behavioral analysis module 146 updates the source database 162 by inserting the source (and the relevant source identifiers and attributes) into the source database 162.

If the source is in the source database 162, the source database 162 provides the relevant source identifier information to the behavioral analysis module 146 and the process 400 moves to block 434. In block 434, for each retrieved source identifier, the behavioral analysis module 146 calculate attribute scores (for each attribute of the source identifier) by comparing each attribute to like attributes of legitimate sources (from the source database 162) to calculate attribute scores.

The process 400 then moves to block 436, where the behavioral analysis module 146 calculates an identifier score (for each source identifier) by combining all of the attribute scores of that particular source identifier. The process 400 then moves to block 438, where the behavioral analysis module 146 calculates an interim reputation score for the suspicious HTTP request by combining all of the source identifier scores.

The process 400 then moves to block 442, where the correlation module 148 begins execution of steps to update/adjust the interim reputation scores. In block 442, the correlation module 148 queries, for each attribute of the suspicious HTTP request, the attack database 164 to retrieve attack IDs related to the particular attribute in the query. The query is performed for each attribute (e.g., source identifiers (e.g., the IP address), User-Agent, potential attack indicators (identified by the detection module 140)) of the suspicious HTTP request. The process 400 then moves to block 444, where the correlation module 148 calculates a correlation score for each attack ID.

In block 446, the correlation module 148 evaluates each correlation score against a threshold criterion (e.g., a threshold value) to determine whether the suspicious HTTP request is related to any of the attack IDs in the attack database 164. If one or more of the attack IDs have a correlation score that is greater than or equal to the threshold value, the process 400 moves to block 450, where the correlation module 148 assigns the attack ID with the highest correlation score to the suspicious HTTP request. The process 400 moves to block 452 from block 450, where the correlation module 148 or the behavioral analysis module 146 finalize the reputation scores by updating/modifying/adjusting the interim reputation (based on the correlation scores) to create a "final reputation scores". The process 400 then moves to blocks 470 and 454. In block 454, the indicator database 160 and the source database 162 are updated based on the final reputation scores. In block 470, the final reputation score is used as input for the composite scoring module 152.

Returning to block 446, if none of the attack IDs have a correlation score that is greater than or equal to the threshold value, the process 400 moves to block 448, where correlation module 148 creates a new attack ID for the suspicious HTTP request and stores the new attack ID in the attack database 164 together with the attributes of the HTTP request. The process 400 then moves to block 452, where the correlation module 148 or the behavioral analysis module 146 finalize the interim reputation scores by setting the interim reputation scores as the "final reputation scores".

In parallel to the execution of blocks 404-454, the process 400 also executes blocks 456-468, which are performed by the application mapping module 150. At block 456, the application mapping module 150 compares the URL and parameters of the suspicious HTTP request with a stored list of URLs and parameters from previous or contemporary HTTP requests. At block 458 the application mapping module 150 calculates an initial application score, for example a neutral score, for the suspicious HTTP request. In block 460, the application mapping module 150 checks whether the URL or parameters of the suspicious HTTP request are in common with the stored URLs and parameters that are known to generate a large number of FP markings (i.e., flags). In general, URLs and parameters which generate a large number of FP markings (i.e., flags) are URLs and parameters which generate a large number of false indications of being suspicious or malicious HTTP requests. If the outcome of block 460 is true (i.e., yes), the process 400 moves to block 462, where the application mapping module 150 adjusts the initial application score in order to mitigate FP. The process 400 then moves to block 468, where the application score is output and sent to the composite scoring module 152.

If the outcome of block 460 is false (i.e., no), the process 400 moves to block 464, where the application mapping module 150 checks whether the URL or parameters of the suspicious HTTP request are in common with the stored URLs and parameters that are known to be attacked frequently. If the outcome of block 464 is true (i.e., yes), the process 400 moves to block 466, where the application mapping module 150 adjusts the initial application score in order to reduce the likelihood that the HTTP request will be passed to the web server 120 (thereby reducing the likelihood of malicious attack). The process 400 then moves to block 468. If the outcome of block 464 is false (i.e., no), the process 400 moves to block 468.

Note that execution of block 460 and 464 may be performed in a different order than illustrated in FIG. 4E, or may be performed in parallel, or may be performed in a single step.

At block 470, the composite scoring module 152 receives the following inputs: a) the aggregate indicator score from the indicator analysis module 144 (from block 424), b) the final reputation score from the behavioral analysis module 146 (from block 452), and c) the application score from the application mapping module 150 (from block 468).

The process 400 then moves to block 472, where the composite scoring module 152 combines the scores received at block 470 to calculate a single composite score for the suspicious HTTP request. The process 400 then moves to block 474, where the composite scoring module 152 evaluates the composite score against a threshold criterion, for example, a threshold value. If the composite score is greater than or equal to the threshold value, the process 400 moves to block 408, where the system 130 releases the HTTP request through to the web server 120. If the composite score is less than the threshold value, the process 400 moves to block 476, where the system 130 takes protective action (e.g., blocks the HTTP request, redirects the web client 108 to a homepage).

Returning now to FIG. 3, the system 130 further includes (or is linked to) a display device 170 (e.g., display monitor. LCD screen, etc.) and input devices 172 (e.g., keyboard, mouse, etc.). The management module 156 is linked to the input devices 172. The management module 156 may, for example, include a user input interface or a graphical user interface (GUI) that is executed by the CPU 132 and displayed by the display device 170. The input interface enables a user (i.e., a system administrator) to input/adjust parameters and settings of the system 130 via the input devices 172. For example, the user may set or adjust the settings for each of the web applications hosted by the web server 120, including the composite threshold criterion. e.g., threshold score (used in block 474) against which the composite threshold score is evaluated.

The management module 156 is also linked to the display device 170, which enables the system 130 to provide display and user interface capabilities. The management module 156 collects/aggregates data from the modules of the system 130 and processes that data to produce output data for viewing by a system administrator of the system 130 via the display device 170. The output data may include qualitative and quantitative data and information, including, for example, the total number of HTTP requests received by the system 130, the number of times protective actions were taken against HTTP requests, statistical information pertaining to the HTTP requests (e.g., average number of FP, average number of TP, etc.), the scores provided by the various modules, attack IDs (either all of the attack IDs or a snippet of the attack IDs from the attack database 164) and relevant data pertaining to each displayed attack ID (e.g., URL attacked, web server/application attacked, source IP address, etc.), data logs, and the number of bot attacks detected by the bot detection module 154.

The management module 156 may be integrated as part of a computer security system, such as a security information and event management (SIEM) system. Alternatively, the management module 156 may be separate from such a security system, but the system 130 may be linked to the security system. By integrating or linking components of the system 130 with a security system, the management module 156 is able to provide data and information, based on the aggregated/collected data from the modules of the system 130, to the security system.

As mentioned above, the bot detection module 154 provides the system 130 with bot detection capabilities. As is generally known in the art, bots are malicious software agents that run on infected client computers which may collectively form a botnet. Each bot in a botnet is remotely controlled by a malware originator from a command and control server, and runs autonomously and automatically on the infected machine, allowing infection of other machines (i.e., computers) via propagation of malicious content by the bots to web applications visited by other machines. The malicious content may be propagated to the web applications via automated HTTP requests sent by the bots. The purpose of the bot detection module 154 is to identify HTTP requests addressed to the web server 120 that are sent by bots.

In order to perform this functionality, the bot detection module 154 injects code, via a script injector 158, into HTTP responses that contain HTML pages sent by the web server 120 to the client device 100. Specifically, when the client device 100 sends an HTTP request (to the web server 120) to view an HTML page, the bot detection module 154 intercepts the HTTP response that includes the HTML page before the HTTP response arrives at the client device 100. In a particular non-limiting implementation, the script injector injects JavaScript code into the HTML page of the HTTP response, and forwards (i.e., releases) the HTTP response through to the client device 100. The web client 108, in response to receiving the HTTP response, executes web server code as well as the injected JavaScript code.

Execution of the injected JavaScript code by the web client 108 causes three main actions to take place. The first action is the creation of an encrypted and cryptographically signed token that is indicative of whether the HTML page was opened in the web client 108. The second action is the creation of cookies through which the tokens can be passed. The third action is the monitoring of activity of the user of the client device 100.

Regarding the first two actions, when the client device 100 sends a subsequent HTTP request to the web server 120, the cookie and token are passed along with the HTTP request to the web server 120. If the HTTP request does not include a token, the bot detection module 154 determines that the HTML page sent in the initial HTTP response was never opened in the web client 108, which indicates that the client device 100 is a bot. As such, the bot detection module 154 can block or redirect any HTTP requests that are received without valid tokens.

If the HTTP request includes a valid token, the bot detection module 154 determines that the HTML page sent in the initial HTTP response was opened in the web client 108. The bot detection module 154 then performs additionally tasks to determine whether the client device 100 is a bot.

Regarding the third action, the injected JavaScript code allows for monitoring and tracking of the actions performed by the user of the client device 100 while viewing the HTML page. The JavaScript code, when executed, tracks and monitors activity performed on the client device 100 in order to identify events and to detect behavioral patterns associated with different tools and input devices associated with the client device 100. The JavaScript code enables such monitoring and tracking by creating hooks on all Asynchronous JavaScript and XML (AJAX) requests and HTML form submit events. Examples of events identifiable as a result of the execution of the JavaScript code include, but are not limited to, mouse touch events, mouse movement events, mouse click events, keyboard related events. Examples of behavioral patterns detectable as a result of the execution of the JavaScript code include, but are not limited to, keystroke speed, mouse click coordination, performance of tasks in proper sequence (e.g., ALT+TAB). The JavaScript code, when executed, also calculates a score, based on the monitored and tracked activity, and provides the score (along with output data) to the bot detection module 154.

Attention is now directed to FIG. 5 which shows a flow diagram detailing a computer-implemented process 500 in accordance with embodiments of the disclosed subject matter. This computer-implemented process includes an algorithm for identifying HTTP requests sent by bots. Reference is also made to the elements shown in FIGS. 1-3. The process and sub-processes of FIG. 5 are computerized processes performed by the system 130 including, for example, the CPU 132 and associated components, such as the bot detection module 154 and the script injector 158. The aforementioned processes and sub-processes are for example, performed automatically, but can be, for example, performed manually, and are performed, for example, in real time.

The process 500 begins at block 502 where the system 130, and more specifically the bot detection module 154, receives (i.e., intercepts) an HTTP response sent by the web server 120 to the client device 100. As mentioned above, the web server 120 sends the HTTP response to the client device 100 in response to an HTTP request received from the client device 100. The process 500 then moves to block 504.

At block 504, the bot detection module 154 determines whether the HTTP response contains an HTML page. In order to make the determination, the bot detection module 154 may open the HTTP response and break or parse the contents of the HTTP response into subcomponents, including, for example, response header fields, which indicate the content type for the HTTP response. If the HTTP response does not contain an HTML page, the process 500 moves to from block 504 to block 506, where the HTTP response is released through to the client device 100.

If, however, the HTTP response contains an HTML page (for example, as indicated by the content type field of the HTTP response message), the process 500 moves from block 504 to block 508, where the bot detection module 154 injects code (preferably JavaScript code) into the HTTP response. The JavaScript code injection is carried out by the script injector 158, which injects code segments of JavaScript code into the HTTP response messages that create hooks on all AJAX requests and HTML form submit events.

The process 500 then moves to block 510, where the HTTP response (with the injected JavaScript code) is released through to the client device 100. On the client side, the web client 108 opens the HTTP response. Once opened, the injected JavaScript code is executed by the web client 108, and begins executing monitoring and tracking functionality. The injected JavaScript code, when executed, also generates an encrypted token and a cookie, and places the encrypted token in the cookie. It is critical to note that a new token and a new cookie are generated each time the JavaScript code is executed, which occurs each time a request (e.g., AJAX request or HTML form submit event) is generated by the HTML page.

The injected JavaScript code, when executed, also collects user activity related data, and compares the collected data with nominal activity data collected from the non-bot client computers. As a result, the JavaScript code, when executed, calculates a score (block 512) indicative of the confidence level that the client device 100 is a bot (or a non-bot, i.e., human user). For clarity of illustration, a higher score is indicative of a higher confidence that the client device 100 is a bot, whereas a lower score is indicative of a lower confidence that the client device 100 is a bot. For example, the JavaScript code, when executed, may calculate keystroke speed in response to detected keystroke events, and may further compare the calculated keystroke speed with average human keystroke speed to assign a keystroke score. As a further example, the JavaScript code, when executed, may calculate mouse click speed in response to detected mouse click events, and may further compare the calculated mouse click speed with average human mouse click speed to assign a mouse click score. The various scores may be aggregated/combined to form an overall score, which is provided to the bot detection module 154 via the generated cookie.

In block 514, the bot detection module 154 receives a subsequent request, e.g., AJAX request. Under non-suspicious and non-malicious circumstances, the request is generated by the HTML page in response to human user interaction with the HTML page (e.g., clicking on a hyperlink in the HTML page). The process of checking whether the HTTP request is generated by the HTML page is performed in block 516, where the bot detection module 154 checks whether the request includes a cookie (i.e., the cookie that is only generated in response to execution of the injected JavaScript code). If the HTTP request does not include the cookie, the process 500 moves to block 518, where the system 130 takes a protective action by blocking or the HTTP request, or redirecting the HTTP request.

If the HTTP request includes the cookie, the process 500 moves to from block 516 to block 520, where the bot detection module 154 extracts the encrypted token and the score from the cookie. In addition, the bot detection module 154 decrypts and verifies the token to ensure that the token is a valid token. In this way, bots are prevented from circumventing the system 130 by utilizing expired tokens or previously valid tokens from previous HTTP requests.

The process 500 then moves to block 522, where the bot detection module 154 evaluates the extracted score against a threshold criterion (e.g., a threshold value). If the score satisfies the threshold criterion, for example, if the score is above or equal to a threshold value, the process 500 moves to block 524, where the system 130 take one or more protective actions. The protective actions may include, for example, blocking the HTTP request, or presenting the client device 100 with a challenge, such as a captcha. If the score dissatisfies (i.e., does not satisfy) the threshold criterion, for example, if the score is below the threshold value, the process 500 moves to block 526, where the HTTP request is released through to the web server 120.

Parenthetically, the execution of the steps associated with the process 500 may be performed in parallel (i.e., contemporaneously) with the execution of the steps associated with the process 400.

In addition to bot detection capability and HTTP request handling based on the execution of the modules 140-154, the system 130 may also provide application layer DoS attack mitigation functionality. As discussed above, the response time attribute, that is stored in the source database 162, may also be used to identify and mitigate application layer DoS attacks. The application layer is interchangeably referred to as Layer7 in accordance with the Open System Interconnection (OSI) model. Returning now to FIG. 3, the system 130 further includes a Layer7 DoS protection module 174 that counteracts Layer7 DoS attacks which attempt to deny legitimate users from accessing the web application 121. The Layer7 DoS protection module 174 is connected or linked to all other components of the system 130, each other either directly or indirectly.

The Layer7 DoS protection module 174 monitors response times based on the response time attribute. In the case of a response time that is greater than a threshold value, the Layer7 DoS protection module 174 marks (i.e., flags) the web application 121 (for which the HTTP request was sent) as being under a DoS attack. Similar to the bot detection module 154, the Layer7 DoS protection module 174 injects code (e.g., JavaScript code) that generates cookies and tokens into the HTML page of the HTTP response message, and then forwards the HTTP response through to the client computer that sent the HTTP request. In this way, the Layer7 DoS protection module can block HTTP requests that do not include valid cookies/tokens. The Layer7 DoS protection module 174 may include a dedicated script injector (not shown) for injecting code (e.g., JavaScript code) into HTTP response messages, or may leverage the script injector 158 of the bot detection module 154.

The behavioral analysis module 146 may also generate DoS confidence scores for HTTP requests and source IP addresses associated web applications that are marked (i.e., flagged) as being under DoS attack by the Layer7 DoS protection module 174. The Layer7 DoS protection module 174 may take one or more protective actions against HTTP requests and source IP addresses that correspond to DoS confidence scores indicative of DoS attack. Such protective actions include, but are not limited to, blocking such HTTP requests and/or blacklisting future HTTP requests from that source IP address for a predefined duration (e.g., 5 minutes).

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for providing security to a web server hosting at least one web application, comprising:
receiving a request message from a client device that is addressed to the web server;
analyzing the request message by at least scanning a payload of one or more subcomponents of the request message to identify keyword or keyword strings as potential attack indicators that are present in the request message, each potential attack indicator having a score;
calculating a composite score for the request message based in part on:
the scores of the potential attack indicators, and
a reputation score assigned to the request message that is associated with behavior of the client device relative to other client devices sending request messages to the web server; and
handling the request message in accordance with the composite score.

2. The method of claim 1, wherein the reputation scores are calculated based on comparisons between attributes of one or more identifiers of the client device and attributes of one or more identifiers of the other client devices.

3. The method of claim 2, wherein the attributes of the one or more identifiers of the other client devices are stored as entries in a source database and are updated based on the comparisons.

4. The method of claim 3, wherein the assigned scores are stored as entries in an indicator score database, and wherein the assigned scores in the indicator score database are updated based on the comparisons.

5. The method of claim 2, further comprising:
calculating a correlation score for the request message based on attributes of the request message that are related to attributes of other request messages associated with malicious attacks on the web server.

6. The method of claim 5, further comprising:
updating the reputation score assigned to the request message based on the correlation score.

7. The method of claim 1, further comprising:
calculating combinations of the potential attack indicators and combination scores for the combinations of the potential attack indicators, wherein the combinations of the potential attack indicators include pairwise string combinations, and wherein the composite score is further based in part on the combination scores.

8. The method of claim 1, further comprising:
comparing a Uniform Resource Locator (URL) and one or more parameters of the request message with a listing of URLs and parameters known to be subject to malicious attacks;
comparing the URL and the one or more parameters of the request message with a listing of URLs and parameters known to be to generate false indications of being malicious request messages, and
wherein the composite score is further based in part on the comparisons with the listing of URLs and parameters known to be subject to malicious attacks and the listing of URLs and parameters known to be to generate false indications of being malicious request messages.

9. The method of claim 1, wherein the handling includes at least one of blocking the request message or passing the request message to the web server.

10. The method of claim 1, further comprising:
evaluating the composite score against at least one threshold criterion, and wherein the handling includes blocking the request message if the composite score satisfies the at least one threshold criterion, and wherein the handling includes passing the request message to the web server if the composite score dissatisfies the at least one threshold criterion.

11. The method of claim 1, wherein the request message is a hypertext transfer protocol (HTTP) request message.

12. A computer system for providing security to a web server hosting at least one web application, comprising:
a storage medium for storing computer components; and
a computerized processor for executing the computer components comprising:
a detection module configured for:
receiving a request message from a client device that is addressed to the web server, and
analyzing the request message by at least scanning a payload of one or more subcomponents of the request message to identify keyword or keyword strings as potential attack indicators that are present in the request message, each potential attack indicator having a score; and
a composite scoring module configured for:
calculating a composite score for the request message based in part on:
the scores of the potential attack indicators, and
a reputation score assigned to the request message that is associated with behavior of the client device relative to other client devices sending request messages to the web server; and
handling the request message in accordance with the composite score.

13. The computer system of claim 12, further comprising:
a source database, and wherein the computer components further comprise:
a source collection module configured for:
analyzing request messages to extract source identifiers of other client devices that previously sent request messages to the web server,
assigning one or more attributes to each of the source identifiers, and
storing the assigned attributes and source identifiers in the source database.

14. The computer system of claim 13, wherein the computer components further comprise:
a behavioral analysis module configured for:
calculating the reputation scores based on comparisons between attributes of one or more identifiers of the client device and assigned attributes and the source identifiers stored in the source database.

15. The computer system of claim 14, wherein the behavioral analysis module is further configured for:
updating the assigned attributes and the source identifiers stored in the source database are based on the comparisons.

16. The computer system of claim 15, further comprising:
an indicator score database that stores the assigned scores, and wherein the computer components further comprise:
an indicator analysis module configured for:
retrieving the assigned scores from the indicator score database, and
updating the assigned scores based on the comparisons.

17. The computer system of claim 16, wherein the indicator analysis module is further configured for:
calculating combinations of the potential attack indicators and combination scores for the combinations of the potential attack indicators, wherein the combinations of the potential attack indicators include pairwise string combinations, and wherein the composite score is further based in part on the combination scores.

18. The computer system of claim 12, wherein the computer components further comprise:
a correlation module configured for:
calculating a correlation score for the request message based on attributes of the request message that are related to attributes of other request messages associated with malicious attacks on the web server.

19. The computer system of claim 12, wherein the computer components further comprise:
an application mapping module configured for:
comparing a Uniform Resource Locator (URL) and one or more parameters of the request message with a listing of URLs and parameters known to be subject to malicious attacks;
comparing the URL and the one or more parameters of the request message with a listing of URLs and parameters known to be to generate false indications of being malicious request messages, and
wherein the composite score is further based in part on the comparisons with the listing of URLs and parameters known to be subject to malicious attacks and the listing of URLs and parameters known to be to generate false indications of being malicious request message.

20. The computer system of claim 12, wherein the request message is a hypertext transfer protocol (HTTP) request message.

\* \* \* \* \*